United States Patent

Watzke

[11] Patent Number: 5,967,713
[45] Date of Patent: Oct. 19, 1999

[54] QUICK-CHANGE INSERT

[75] Inventor: Ruediger Watzke, Speikern, Germany

[73] Assignee: Emuge-Werk Richard Glimpel Fabrik fuer Praezisionswerkzeuge vormals Moschkau & Glimpel, Lauf, Germany

[21] Appl. No.: 09/154,638

[22] Filed: Sep. 17, 1998

[30] Foreign Application Priority Data

Sep. 25, 1997 [DE] Germany ............... 197 42 269

[51] Int. Cl.⁶ ................................................. B23B 31/10
[52] U.S. Cl. ................ 408/239 A; 279/76; 279/143; 408/226
[58] Field of Search ............... 279/76, 79, 143, 279/145; 408/226, 238, 239 A, 239 R

[56] References Cited

U.S. PATENT DOCUMENTS

| | | | |
|---|---|---|---|
| 2,990,739 | 7/1961 | Zifferer | 408/238 |
| 3,830,135 | 8/1974 | Sullivan | 279/76 |
| 4,340,328 | 7/1982 | Proulx et al. | 408/226 |
| 4,995,768 | 2/1991 | Craft | 408/239 A |
| 5,398,946 | 3/1995 | Quiring | 279/145 |
| 5,613,693 | 3/1997 | Ramunas | 279/76 |

*Primary Examiner*—Andrea L. Pitts
*Assistant Examiner*—Monica Smith
*Attorney, Agent, or Firm*—Jordan and Hamburg LLP

[57] ABSTRACT

A quick-change insert, particularly for hard alloy taps, has a seat for a square end section of the tap forming the rotational connection and a pull-out holding device. In the region of the square end section, at least one indentation is provided for the positive engagement of a locking pin, which is under the tension of a spring, mounted in the quick-change insert with limited longitudinal mobility and, in use, is blocked by an overlapping collar of the chuck body.

18 Claims, 1 Drawing Sheet

QUICK-CHANGE INSERT

BACKGROUND OF THE INVENTION

The invention relates to a quick-change insert, particularly for hard alloy taps, with a seat for a square end section of the tap forming the rotational connection and a pull-out holding device.

Usually, the pull-out holding device of such quick-change inserts is constructed in the form of balls, which are mounted in the wall of the quick-change insert and can be pressed into the outer surface of the drill. In so doing, they "dig" small hemispherical indentations into the drill, so that sufficient security against pulling out is achieved for all normal metal drills in this manner. However, this principle of holding does not function or at best functions very unsatisfactorily in hard alloy drills, since in this case the balls are not impressed sufficiently into the drill surface and, with that, cannot provide adequate pull-out anchoring.

SUMMARY OF THE INVENTION

It is therefore an object of the invention to configure a quick-change insert of the type mentioned above in such a manner that it offers adequate holding against pull-out even when hard alloy inserts, that is, particularly hard alloy taps, are used.

Pursuant to the invention, this objective is accomplished owing to the fact that, in the region of the square end section, at least one indentation is provided for the positive engagement of a locking pin, which is under the tension of a spring, mounted in the quick-change insert with limited longitudinal mobility and, in use, is blocked by an overlapping collar of the chuck.

In contrast to the non-positive pull-out holding device of the known ball locking device, the inventive quick-change insert works with a positive holding device, which is absolutely blocked while in operation, so that the tap can neither be pulled out nor pushed in.

In a further development of the invention, provisions can of course also be made so that indentations for in each case an appropriate number of locking pins are provided in several, for example, two opposite surfaces of the square end section. In the simplest case, the indentation is a hemispherical indentation for engaging a conical pin or a truncated cone pin with a tip adapted to the hemispherical indentation.

Preferably, the indentation should be constructed as a transverse groove, since the tolerance errors can be compensated for more easily in this manner and there is no danger that the locking pin does not engage the indentation with an accurate fit, as could be the case in unfavorable cases when there is a slight shift to the side in the case of a conical tip and a conical, hemispherical indentation. For this reason, only a transverse groove is used in the following.

In order to make it easier to loosen the tap after the quick-change insert is taken out of the chuck body, provisions can be made in a further development of the invention so that the locking pin is provided at its inner flank with a disengaging slope. Conversely, it is advisable to provide the inner end of the tap with an insertion slope for disengaging the locking pin when the tap is inserted into the quick-change insert.

In order to ensure an accurate fit of the depth of insertion of the tap, the transverse groove shall be perpendicular at the outer flank, corresponding to the perpendicular construction of the outer flank of the locking pin.

The locking pin preferably is constructed as a round pin. Constructions, which are not round would be considerably more expensive and, in particular, would make it more difficult to form the bearing recess in the quick-change insert. In order to prevent any twisting of the locking pin, which would interfere with its function, provisions can be made in a further development of the invention to provide protection against twisting.

For this purpose, the locking pin can preferably be provided with a lateral groove or also with a groove, which is disposed in its outer end surface and is engaged by an O-ring, which preferably is mounted countersunk in a peripheral groove of the quick-change insert. This O-ring not only provides security against twisting but also, at the same time, the elastic tension on the locking pin in the locking position braced inward.

The longitudinal construction of the locking pin is dimensioned accurately so that, when the pin locks into the transverse groove of an inserted tap, its outer end surface is exactly flush with the outer surface of the quick-change insert, so that the locking pin is reliably prevented from making any movement towards the outside and, with that, any unwanted loosening is prevented, by an overlapping collar of the chuck body. Only when the quick-change insert has been taken out of the chuck body once again and, with that, the locking pin is free towards the outside, can the tap, favored by the disengaging slope, be simply pulled out.

Further advantages and details of the invention arise out of the following description of an example as well as from the accompanying drawings.

DESCRIPTION OF THE PREFERRED EMBODIMENTS

Figure 1:
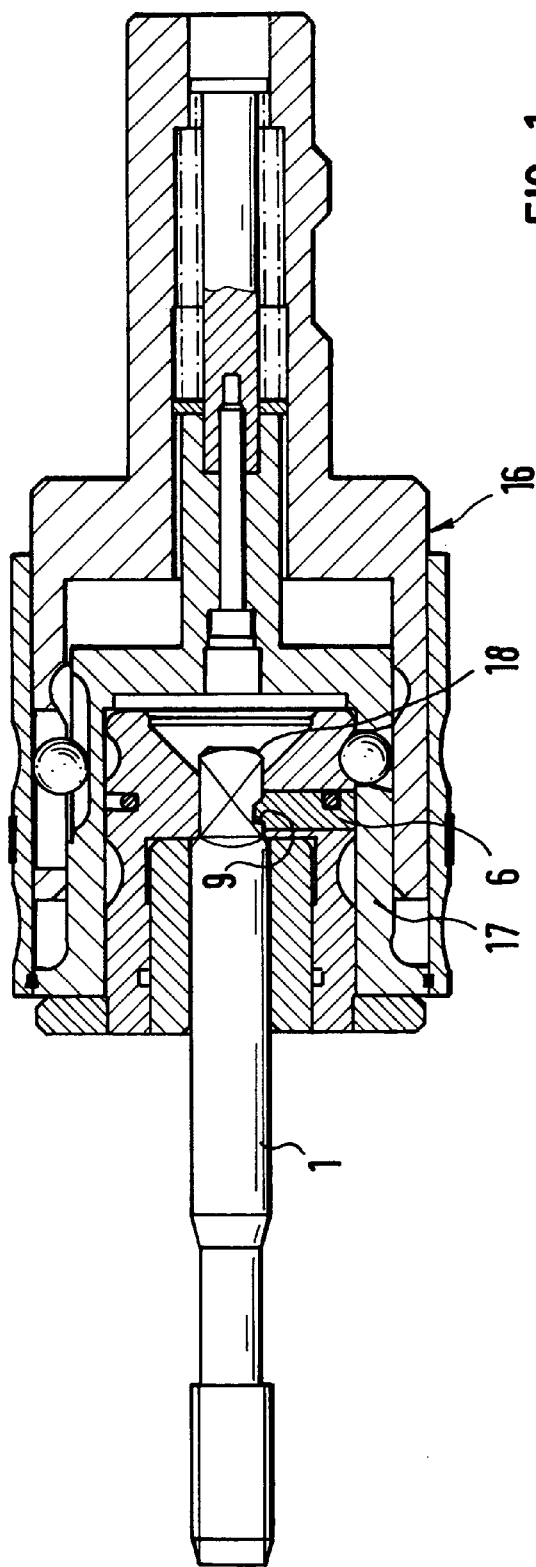
FIG. 1 shows a longitudinal section through a quick-change insert latched into a chuck body.
Figure 2:
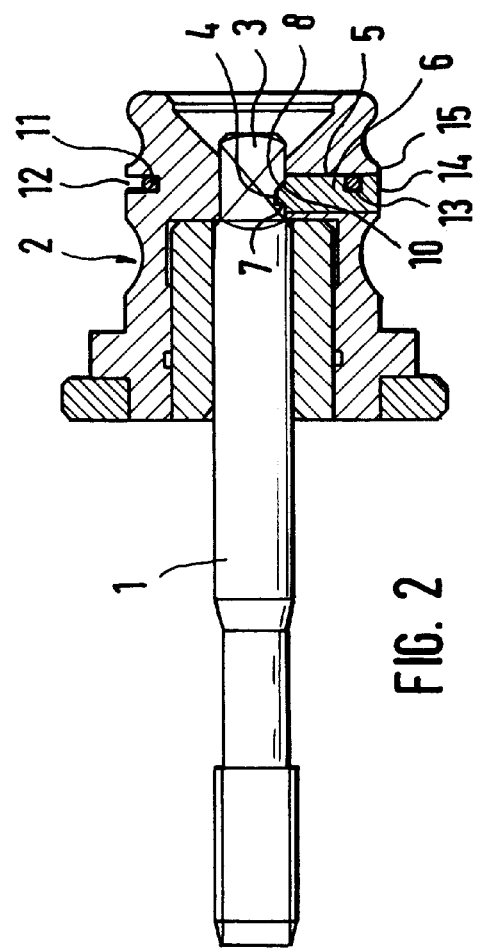
FIG. 2 shows the quick-change insert without the chuck body.

With the help of its square socket 3, the tap 1 is held in a quick-change insert 2 so that there can be no mutual rotation. As a pull-out holding device, a transverse groove 4, which can be engaged by a locking pin 6 that has limited mobility in a borehole 5, has been put in place in the square socket 3. The transverse groove has a front flank 7, which is essentially vertical, and an inclined rear flank 8, which correspond to a correspondingly steeply arranged outer flank 9 of the locking pin 6 and a correspondingly inclined pull-out slope 10 of the locking pin. An O-ring 11, which is inserted into a peripheral groove 12 of the quick-change insert, serves to place the locking pin under tension in the inwardly directed locking position. By these means, the O-ring 11 at the same time provides security against twisting of the locking pin 6, which is constructed as a round pin.

The length of the locking pin 6 is selected so that an outer end face 14, in the use position of a tap 1, lies precisely in the outer surface 15 of the quick-change insert 2. In the inserted position of the quick-change insert in the chuck body 16, shown in FIG. 1, the locking pin 6 is therefore blocked against any movement towards the outside by the collar 17 of the chuck body, which collar lies against the outer surface 15 of the quick-change insert. Therefore, it is possible to pull out the tap 1, facilitated by the pull-out slope 10, only when the quick-change insert 2 is pulled out of the chuck body 16. The chuck body 16 will not be described in detail here, since such chuck bodies are adequately known in the art and the essence of the invention lies only in the construction of the quick-change insert.

The invention is not limited to the example shown. As described further above, it would be possible to provide not only one transverse groove in one of the surfaces of the square end section, but also several transverse grooves in several side surfaces of the square end section for engagement by a corresponding number of locking pins. Deviating from the example shown, it would also be possible to provide the locking pin 6 also at the front flank with a slope, since this flank need not fit accurately against the tap 1, as can be seen from the drawing. Finally, instead of a transverse groove, it would also be possible to use a hemispherical indentation, which corresponds to a conical tip of the locking pin 6 or to a tip of the locking pin 6 in the shape of a truncated cone.

What I claim is:

1. A quick-change insert for a tap comprising a quick-change structure having a socket with a polygonal cross-sectional configuration, a tap having an end section having a polygonal cross-sectional configuration corresponding to the cross-sectional configuration of said socket, said end section of said tap being received in said socket, a locking pin mounted on said quick-change structure, an indentation on said end section of said tap, said indentation being engaged by said locking pin, a biasing device on said quick-change structure biasing said locking pin toward said indentation, said quick-change insert being used with a chuck body having a collar disposed about at least a portion of said quick-change structure and overlapping said locking pin to block removal of said pin from said quick-change structure.

2. A quick-change insert according to claim 1 wherein said crosssectional configuration of said socket and said cross-sectional configuration of said end sections of said tap are square cross-sectional configurations.

3. A quick-change insert according to claim 1 wherein said indentation comprises a transverse groove.

4. A quick-change insert according to claim 1 wherein said indentation includes a hemispherical indentation, said locking pin having a conical end received in said indentation.

5. A quick-change insert according to claim 1 wherein said indentation includes a hemispherical indentation, said locking pin having an end part having the configuration of a truncated cone.

6. A quick-change insert according to claim 1 wherein said end section of said tap has plural mutually perpendicular surfaces, said indentations being provided in at least two of said surfaces.

7. A quick-change insert according to claim 1 wherein said tap has a longitudinal axis, said tap being moveable in one longitudinal direction parallel to said longitudinal axis to effect withdrawal of said tap from said socket, said locking pin having a withdrawal surface disposed at an acute angle relative to said longitudinal axis.

8. A quick-change insert according to claim 7 wherein said locking pin has an inserted position and a withdrawn position, said locking pin when in said inserted position extending into said socket, and said locking pin when in said withdrawn position being displaced from extending into said socket, said collar being removed from its position about said portion of said quick-change structure when said end section of said tap is being removed from said socket, said withdrawal surface engaging and moving said locking pin from said inserted position toward said withdrawn position as said end section of said tap is withdrawn from said socket.

9. A quick-change insert according to claim 1 wherein said tap has a longitudinal axis, said tap being moveable in one longitudinal direction parallel to said longitudinal axis to effect insertion of said tap into said socket, said end section of said tap having an insertion sloping surface engageable with said locking pin during insertion of said end portion of said tap into said socket, said insertion sloping surface being disposed at an acute angle relative to said longitudinal axis.

10. A quick-change insert according to claim 9 wherein said locking pin has an inserted position and a withdrawn position, said locking pin when in said inserted position extending into said socket, and said locking pin when in said withdrawn position being displaced from extending into said socket, said end section of said tap being insertable in said socket before said collar is disposed about said portion of said quick-change structure, said insertion sloping surface engaging and moving said locking pin from said inserted position toward said withdrawn position as said end section of said tap is inserted into said socket.

11. A quick-change insert according to claim 1 wherein said locking pin has an inserted position and a withdrawn position, said locking pin when in said inserted position extending into said socket, and said locking pin when in said withdrawn position being displaced from extending into said socket, said tap having an elongate axis, said locking pin having a longitudinal axis substantially perpendicular to said elongate axis, said locking pin being slidable parallel to said longitudinal axis when said locking pin is moved between said inserted and withdrawn positions.

12. A quick-change insert according to claim 1 wherein said locking pins has a circular cross-sectional configuration, said locking pin having an elongate central axis, and an engageable part engaging said locking pin to prevent rotation of said locking pin about said central axis.

13. A quick-change insert according to claim 1 wherein said biasing device includes a resilient O-ring.

14. A quick-change insert according to claim 1 wherein said locking pin has a groove, said biasing device comprising an O-ring extending into said groove.

15. A quick-change insert according to claim 1 wherein said quick-change structure includes an outer peripheral groove, said locking pin including a pin groove, said biasing device extending into said outer peripheral groove and into said pin groove.

16. A quick-change insert according to claim 1 wherein said locking pin has an inserted position and a withdrawn position, said locking pin when in said inserted position extending into said socket, and said locking pin when in said withdrawn position being displaced from extending into said socket, said biasing device biasing said locking pin toward said extended position.

17. A quick-change insert according to claim 1 wherein said locking pin has an inserted position and a withdrawn position, said locking pin when in said inserted position extending into said socket, and said locking pin when in said withdrawn position being displaced from extending into said socket, said portion of said quick-change structure being a generally outer cylindrical portion, said locking pin having an outer longitudinal end substantially flush with said outer cylindrical portion when said locking pin is in said extended position.

18. A quick-change insert according to claim 17 wherein said collar has an inner cylindrical portion disposed about said outer cylindrical portion of said quick change structure, said inner and outer cylindrical portions having substantially the same diameter, said collar when installed on said quick-change support structure preventing said locking pin from moving from said inserted position to said withdrawn position.

* * * * *